(12) United States Patent
Geschwindt et al.

(10) Patent No.: US 7,875,397 B2
(45) Date of Patent: Jan. 25, 2011

(54) PERMEABLE INLET FUEL GAS DISTRIBUTOR FOR FUEL CELLS

(75) Inventors: James R. Geschwindt, Lynchburg, VA (US); Robin J. Guthrie, East Hartford, CT (US); George S. Hirko, Jr., Manchester, CT (US); Jeremy P. Meyers, Austin, TX (US); Carl A. Reiser, Stonington, CT (US); Javier Resto, Jacksonville, FL (US); Yu Wang, Avon, IN (US); John H. Whiton, South Windsor, CT (US); Leslie L. Van Dine, Manchester, CT (US); Elizabeth A. Allen, Tempe, AZ (US); Deliang Yang, Torrance, CA (US)

(73) Assignee: UTC Power Corporation, South Windsor, CT (US)

( * ) Notice: Subject to any disclaimer, the term of this patent is extended or adjusted under 35 U.S.C. 154(b) by 1687 days.

(21) Appl. No.: 10/736,945

(22) Filed: Dec. 15, 2003

(65) Prior Publication Data
US 2005/0129999 A1    Jun. 16, 2005

(51) Int. Cl.
*H01M 8/06* (2006.01)
*H01M 8/04* (2006.01)
(52) U.S. Cl. .................. 429/415; 429/512; 429/428
(58) Field of Classification Search ............... None
See application file for complete search history.

(56) References Cited

U.S. PATENT DOCUMENTS

| | | | | |
|---|---|---|---|---|
| 6,045,935 A | * | 4/2000 | Ketcham et al. | 429/30 |
| 6,326,095 B1 | * | 12/2001 | Kneidel | 429/19 |
| 6,348,278 B1 | * | 2/2002 | LaPierre et al. | 429/17 |
| 6,569,549 B1 | * | 5/2003 | Sawyer | 429/13 |
| 2002/0076582 A1 | * | 6/2002 | Reiser et al. | 429/13 |
| 2003/0104265 A1 | * | 6/2003 | Yoshimoto et al. | 429/38 |
| 2004/0058220 A1 | * | 3/2004 | Liu et al. | 429/38 |

FOREIGN PATENT DOCUMENTS

JP        57-130380       *   8/1982

* cited by examiner

*Primary Examiner*—Dah-Wei D Yuan
*Assistant Examiner*—Maria J Laios
(74) *Attorney, Agent, or Firm*—M. P. Williams (57) ABSTRACT

An inlet fuel distributor (10-10*d*) has a permeable baffle (39, 54, 54*a*, 60) between a fuel supply pipe (11, 83) and a fuel inlet manifold (12, 53, 53*a*, 63) causing fuel to be uniformly distributed along the length of the fuel inlet manifold. A surface (53, 68) may cause impinging fuel to turn and flow substantially omnidirectionally improving its uniformity. Recycle fuel may be provided (25, 71) into the flow downstream of the fuel inlet distributor. During startup, fuel or inert gas within the inlet fuel distributor and the fuel inlet manifold may be vented through an exhaust valve (57, 86) in response to a controller (58, 79) so as to present a uniform fuel front to the inlets of the fuel flow fields (58).

10 Claims, 6 Drawing Sheets

PERMEABLE INLET FUEL GAS DISTRIBUTOR FOR FUEL CELLS

TECHNICAL FIELD

This invention relates to a fuel cell inlet fuel gas distributor having one or more permeable baffles to supply substantially uniform fuel substantially simultaneously across the length of a fuel inlet manifold, and to vented, fuel inlet chambers which allow air or inert gas to be purged on startup.

BACKGROUND ART

The uneven distribution of fuel to the different fuel cells upon startup can lead to individual fuel cell fuel starvation, voltage reversal, and carbon corrosion, which ultimately results in severe performance loss.

In copending U.S. patent application Ser. No. 10/269,654, filed Oct. 10, 2002, a fuel cell, fuel inlet flow control apparatus divides the fuel flow several times, successively, in a cascade fashion to provide a number of separate flows, and then spreads the flow so as to distribute the fuel substantially uniformly across the entrances to all of the fuel flow fields in the fuel cell stack. Fuel flow transients approach the fuel flow fields of all of the fuel cells in the stack substantially simultaneously and at substantially the same flow rate, during startup and other transient fuel flow conditions. In a disclosed embodiment, the flow is split successively four times and then the flow through all of the outlet passages from the cascade region impinges on a flat surface, which spreads the flow uniformly. Although the cascade fuel distributor distributes the fuel quite evenly, the volume consumed thereby is too large for certain applications. Geometrical constraints may prevent optimal design, in certain applications.

DISCLOSURE OF INVENTION

Objects of the invention include: simplified distribution of fuel at the fuel inlet of a PEM fuel cell stack; providing fuel of substantially uniform flow to the flow fields of all of the fuel cells in a fuel cell stack; substantially simultaneous delivery of a substantially equal amount of fuel to each of the flow fields in a fuel cell stack; increased durability of fuel cell stacks; improved startup and other fuel input transients in fuel cell stacks; reduced air/fuel mix in fuel cell fuel flow fields during startup; and improved, simplified fuel distribution in fuel cell stacks.

According to the present invention, an inlet fuel distributor for a fuel cell stack comprises at least one permeable baffle so as to simultaneously and uniformly deliver fuel across the entire length of a fuel inlet manifold.

According to the invention, the inlet fuel of a fuel cell stack is evenly distributed to the fuel flow fields of all of the fuel cells in a fuel cell stack by providing, from a fuel supply pipe, a tilted chamber formed by one or more permeable walls, selected from porous material, perforated sheet, filter material, screening and honeycomb, through which the inlet fuel must flow, thereby providing flow through each portion of the fuel inlet manifold which is the same as that in each other portion, with a fuel front during startup reaching the entire length of the fuel inlet manifold simultaneously. The permeability of the permeable walls may be tailored by known means such as densification.

In accordance further with the invention, the inlet fuel of a fuel cell stack is evenly distributed to the fuel flow fields of all of the fuel cells, within a permeable tube the size and length of which is such that the pressure drop along the entire length of the tube is very much smaller than the pressure drop through the walls of the tube. In this form of the invention, the tube may be porous, perforated, fine mesh screening.

In accord with the invention, the inlet fuel of a fuel cell stack is provided into a chamber, the opposite end of which is vented so as to allow air or an inert gas (if applicable) to easily escape from the chamber, rather than flowing ahead of the fuel into the fuel flow fields of the stack. The chamber may be large, in comparison with the flow volume that the chamber flows into before entering the fuel flow fields of the fuel cells.

According further to the invention, a dual manifold includes a higher pressure raw fuel inlet manifold which is separated from a lower pressure fuel inlet manifold by means of a permeable baffle. The permeable baffle may comprise a wall in an orthogonal manifold arrangement or it may comprise a permeable tube; recycled fuel, if any, is introduced into the lower pressure manifold after a fuel cell stack is at normal operation with a normal load.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
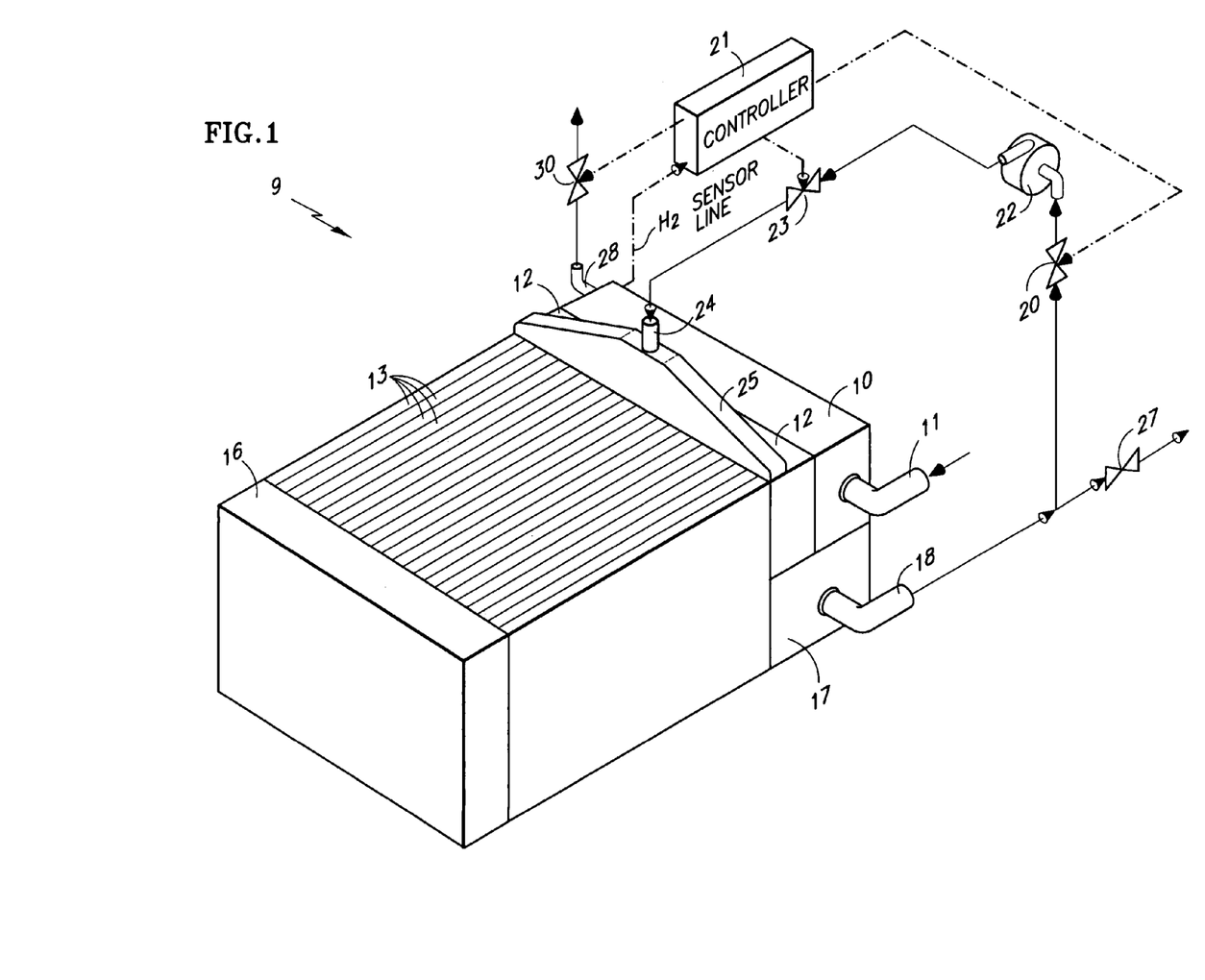
FIG. 1 is a perspective view of a fuel cell stack having an inlet fuel distributor according to the invention.

Referring to FIG. 1, a fuel cell stack 9 includes a compact inlet fuel distributor 10 that receives fuel from a fuel supply pipe 11 and provides it to a fuel inlet manifold 12. The fuel inlet manifold 12 provides fuel to all of the fuel cells 13. In the two-pass configuration shown in FIG. 1, the fuel will flow from the fuel inlet manifold 12 to the left as seen in FIG. 1, across the top half of the fuel cells 13; then it will turn and flow downwardly and to the right in a fuel turnaround manifold 16, after which it will flow across the bottom half of the fuel cells 13 toward the right, as seen in FIG. 1, to a fuel exit manifold 17. Then it will pass through a fuel exhaust pipe 18, typically to a fuel recycle loop including a valve 20 controlled by a controller 21, a fuel recycle pump 22, and another valve 23 controlled by the controller 21, ultimately leading to a recycle fuel gas inlet pipe 24 and a recycle gas inlet manifold 25 that distributes the gas throughout the length of the fuel inlet manifold 12. A valve 27 may be provided for purging the fuel gas chambers of the fuel cell.

In FIG. 1, because the recycle gas enters the fuel inlet manifold downstream of the inlet fuel distributor, there is no need to pressurize the recycle gas up to the pressure of the neat hydrogen entering from a source, the recycle pump 22 may simply be a blower.

Another aspect of the invention, briefly illustrated in FIG. 1, comprises the venting of the inlet fuel distributor 10 by means of a vent pipe 28 under the control of an exhaust valve 30 in response to the controller 21. This will assure that there is fuel throughout the entire length of the inlet fuel distributor 10 when fuel is first supplied during startup of the fuel cell stack, whereby to avoid difficulties of uneven fuel distribution among the various cells, as described hereinbefore. This is described more fully with respect to FIGS. 6 and 10-12 hereinafter.

Figure 2:
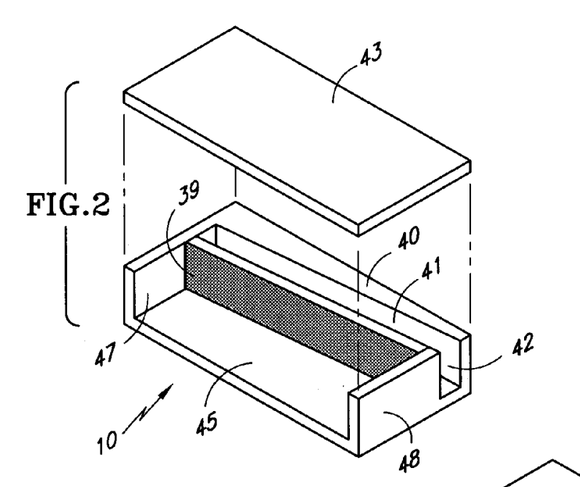
FIG. 2 is a simplified, stylized, perspective view of a first embodiment of inlet fuel distributor according to the invention.
Figure 13:
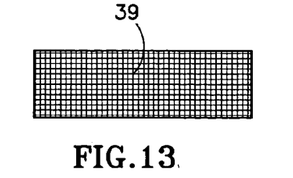
FIGS. 13-15 are plan views of screening, mesh and honeycomb, respectively.
Figure 14:
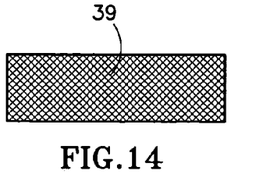
Figure 15:
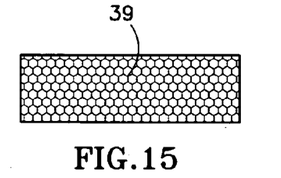

Referring to FIG. 2, an inlet fuel distributor 10 according to the invention comprises a permeable baffle 39 which, together with a wedge-shaped impermeable outer wall 40 form a fuel inlet chamber 41 leading from a fuel inlet 42, and closed off by a cover 43. The distance across a fuel outlet chamber 45, from the permeable baffle 39 to the entrance into the fuel inlet manifold 12 (FIG. 1), is greater near the fuel inlet 42 than it is at the opposite end of the fuel inlet chamber 41. Therefore, the flow differential which may be incurred, as well as the time differential of the fuel front during startup, is compensated by the different flow path length across the fuel outlet chamber 45 from the permeable baffle 39 into the fuel inlet manifold 12. The permeable baffle 39 may be porous, such as sintered metal, porous plastic, carbon or graphite, a perforated sheet of metal or plastic, or it may be screening, mesh or honeycomb as illustrated in FIGS. 13-15.

Because the fuel is typically from a pressurized source, particularly when neat hydrogen (rather than reformate) is used, the fuel in the fuel inlet feed chamber 41 will be at a significantly higher pressure than the fuel in the fuel outlet chamber 45. The pressure drop along the inlet feed chamber 41 may be on the order of one-tenth to one-twentieth of the pressure drop through the permeable baffle 39. Because flow is across a much larger cross section (the length and height of the permeable wall 39) within the fuel outlet chamber 45, the speed of flow is much slower in the fuel outlet chamber 45 than the speed of flow in the feed path 41. Therefore, only a small reduction of distance is required at the far end of the fuel outlet chamber, near a far wall 47, compared with the end of the fuel outlet chamber adjacent a near wall 48, in order to cause the fuel front to simultaneously reach the entire edge of the fuel outlet chamber 45, and therefore the entire length of the fuel inlet manifold 12 (FIG. 1).

Figures 3, 4:
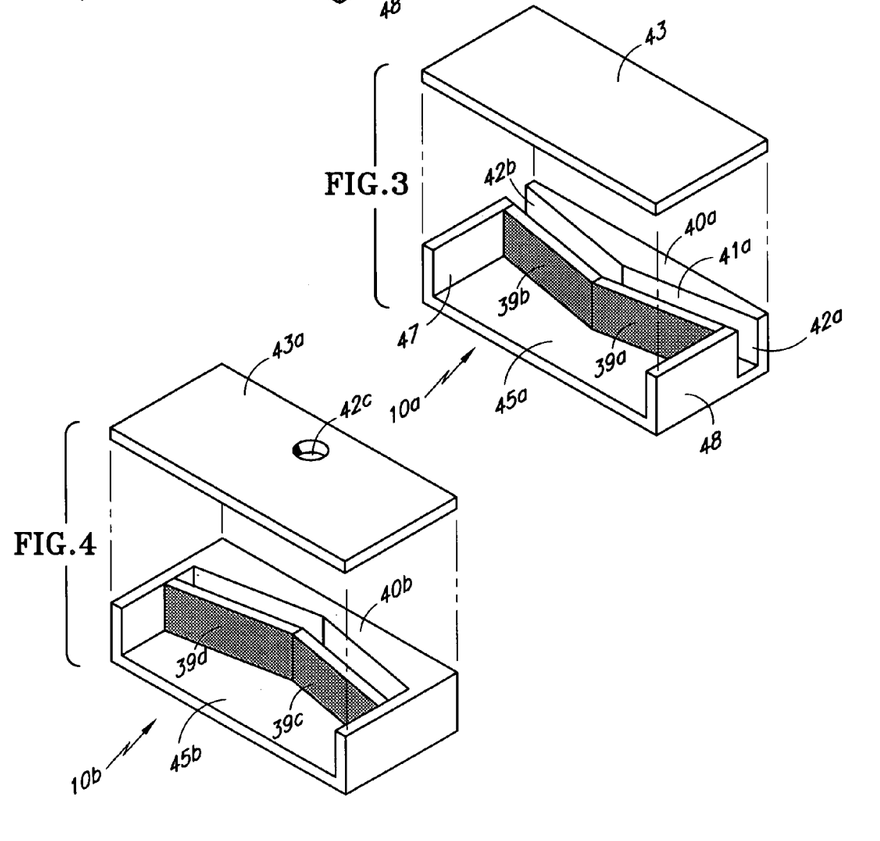
FIG. 3 is a simplified, stylized perspective view of an alternative form of inlet fuel distributor having dual feed.
FIG. 4 is a simplified, stylized perspective view of an alternative form of inlet fuel distributor, having center feed.

Referring to FIG. 3, an inlet fuel distributor 10a has two fuel inlets 42a, 42b. In FIG. 3, a pair of permeable walls 39a, 39b together with an outer wall 40a which is thicker at the center than at the ends, provide a V-shaped fuel inlet fuel chamber 40a and an outlet chamber 45a which has its center closer to the fuel inlet manifold than either of its ends. By supplying fuel into both ends of the distributor 10a, there is more nearly simultaneous uniform flow of fuel into the fuel inlet manifold.

In FIG. 4, an inlet fuel distributor 10b, has a central fuel inlet 42c which passes through the cover 43a. The outer wall 40b is thicker at its ends than in the middle and the permeable baffles 39c, 39d are tilted so that the distance of flow across the outlet chamber 45b is greater in the center of the distributor 10b than it is at the ends thereof. This maintains uniformity of flow from a center feed.

Figure 5:
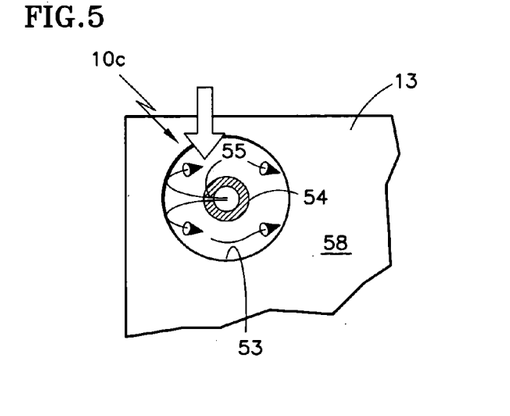
FIG. 5 is a partial, side elevation view of a fuel cell having an internal fuel manifold with an inlet fuel distributor according to the invention disposed therein.
Figure 6:
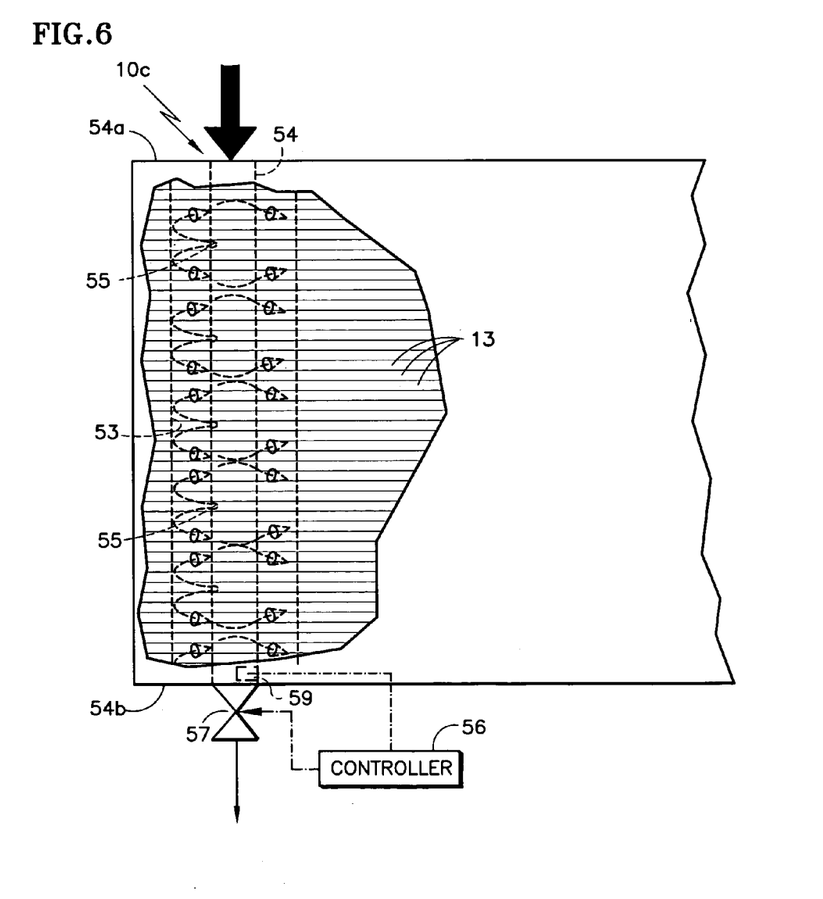
FIG. 6 is a partial, partially sectioned, top plan view of a plurality of fuel cells of FIG. 5.

In FIGS. 5 and 6, an embodiment of the invention provides an inlet fuel distributor 10c within an internal manifold 53 formed within the fuel cells 13. Fuel recycle gas is introduced into the manifold 53, as shown by the open arrow in FIG. 5. A fuel inlet tube 54 receives neat fuel, as indicated by the solid arrow in FIG. 6. The fuel inlet tube 54 has a plurality of small orifices 55 oriented so as to direct fuel toward the wall of the internal manifold 53 at a point thereof which is on the opposite side of the fuel inlet tube 54 from the inlets to the fuel flow fields 58 of the fuel cells 13. The fuel passing through the orifices 55 impinging on the wall of the internal manifolds 53, which is substantially normal to the direction of fuel flow through the small orifices, causes the fuel to change direction and spread, substantially omnidirectionally, thereby causing a uniform flow of fuel around the fuel inlet tube 54 toward the inlets to the fuel flow fields 58. The orifices may be positioned in other directions as long as the incoming fuel mixes with the fuel recycle in the manifold before entering the cells.

By properly sizing the small orifices 55, in contrast with the diameter of the fuel inlet tube 54 and the pressure of the fuel as it enters the fuel inlet tube 54, the pressure drop along the fuel inlet tube 54 will be very small, thereby delivering substantially the same fuel through each of the small orifices 55 along the entire length of the tube 54. Under these circumstances, if desired, fuel recycle flow may be introduced into the internal manifold 53 directly, obviating the need to pressurize it, since the pressure drop through the orifices may result in the pressure within the manifold 53 being on the order of one-half the pressure of that within the fuel inlet tube 54.

If found to be desirable in any utilization of the invention, the tube 54 may be tapered slightly, being larger at an inlet end 54a than at an outlet end 54b.

The fuel inlet tube 54 may have an exhaust valve 57 operated by a controller 56 in response to a hydrogen sensor 59. In this way, when fuel is first introduced into the tube 54 on startup, the air or inert gas standing in the tube 54 may be vented into an air exit manifold (e.g., 90 in FIG. 9). This assures that fuel will enter all the fuel flow fields 58 of all of the fuel cells 13 simultaneously, prior to the controller connecting a load, such as an auxiliary load, to assist in startup, without individual fuel cell fuel starvation, voltage reversal, or carbon corrosion, which could occur with uneven distribution of fuel to the different fuel cells upon startup. Instead of utilizing a hydrogen sensor to determine when the valve 57 may be closed, the controller 56 may hold the valve 57 open for a predetermined adequate amount of time, after which the valve 57 may be closed and the auxiliary load connected when hydrogen in the fuel cells generates open circuit voltage. Instead of venting to an air exit manifold, the purge gas may be vented to a positive pressure safety enclosure, surrounding the entire fuel cell power plant, for dilution with air, or the purged a+gas may be vented into the cathode, where any small amounts of fuel therein may react with air in an insignificant manner.

The perforated fuel inlet tube 54 may be employed in an internal manifold which is rectangular, and may be employed in an external manifold, as should be apparent simply from viewing FIG. 6. The fuel inlet tube may also be formed of a porous material, layers of screening, etc.; but orifices that cause the fuel to impinge the surfaces opposite the inlets to the fuel flow fields are preferred.

Figure 7:
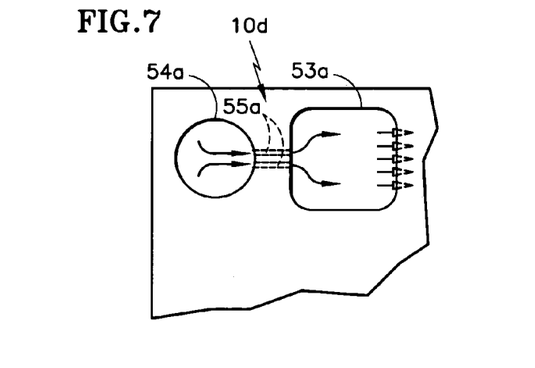
FIG. 7 is a partial, side elevation view of a fuel cell having a pair of internal fuel manifolds with a permeable baffle therebetween forming an inlet fuel distributor according to the invention.
Figure 8:
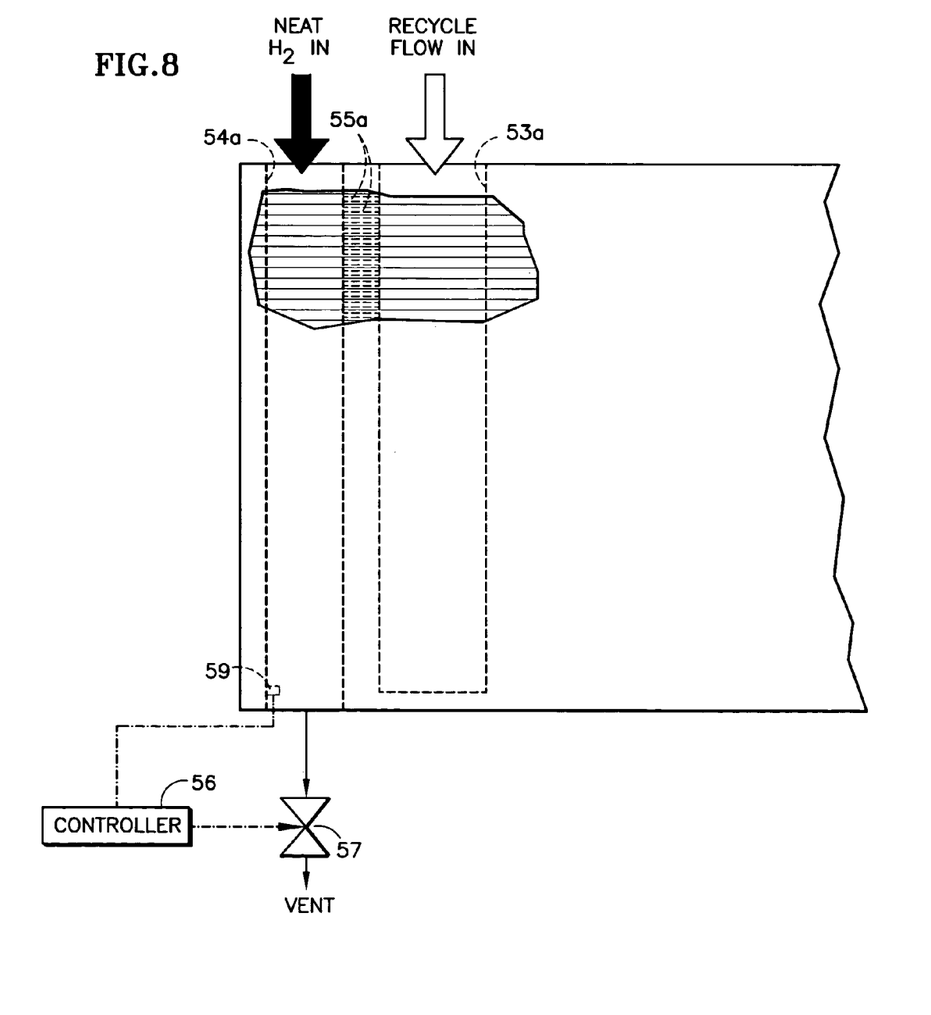
FIG. 8 is a partial, partially sectioned, top elevation view of a plurality of fuel cells of FIG. 7.

A variation of the embodiment shown in FIGS. 5 and 6 is illustrated in FIGS. 7 and 8. Therein, instead of having a tube 54 within an internal manifold 53, a pair of adjacent internal manifolds 54a, 53a have passages 55a, which may either comprise discreet ports, or a porous separation between the internal manifolds 54a, 53a.

In the embodiment of FIGS. 5 and 6, the tube 54 comprises a permeable baffle; in FIGS. 7 and 8, the permeable baffle is provided by the ports 55a, or a porous media between the two manifolds 54a, 53a.

Figure 9:
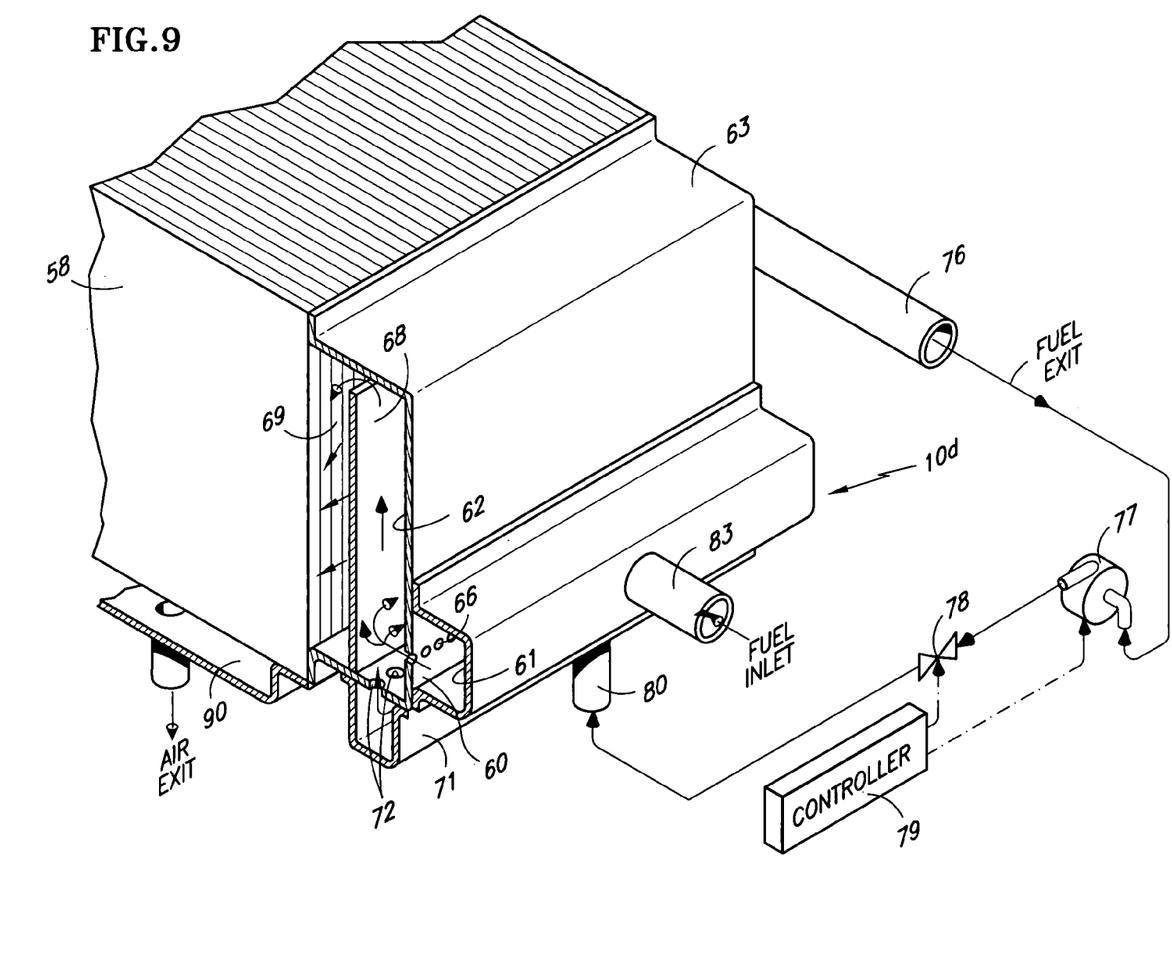
FIG. 9 is a partial, partially sectioned, partially broken away simplified perspective view of another embodiment of the invention.

Referring to FIG. 9, another embodiment of the invention includes an inlet fuel distributor 10d formed by means of a permeable baffle 60 between a primary fuel supply manifold 61 and a fuel inlet chamber 62 of a fuel inlet manifold 63. As illustrated in FIG. 9, the baffle 60 is provided with a plurality of small orifices 66 that extend the length of the primary fuel supply manifold 61. As in the embodiment of FIGS. 5 and 6, fuel passing through the small orifices 66 will impinge on a surface of a solid baffle 68 that separates the fuel inlet chamber 62 from a fuel outlet chamber 69. Since the flow through the orifices 66 is normal to the baffle 68, this will cause the flow to change direction, and flow nearly omnidirectionally and upwardly through the chamber 62, over the top of the baffle 68 and into the fuel outlet chamber 69. This causes the flow of fuel to be substantially uniform before entering the fuel flow fields 58, and causes the fuel to reach the entrances of all of the flow fields 58 substantially simultaneously.

The chamber 62 is also fed recycle fuel gas from a primary recycle manifold 71 through orifices 72 which are larger than the small orifices 66. The fuel recycle gas passes through a fuel exit manifold (not shown), a fuel exit pipe 76, a fuel recycle pump 77, and a valve 78 controlled by a controller 79, into a recycle pipe 80. Because the small orifices 66 are smaller than the orifices 72, the fuel entering the chamber 61 from a fuel supply pipe 83 can be at a significantly higher pressure than the recycle fuel gas from the fuel recycle pump 77. This reduces the need for pressurizing the fuel recycle gas, and thereby reduces parasitic losses in the system; the pump 77 may therefore be simply a blower. The recycle gas enters through the orifices 72 along the entire length of the fuel inlet manifold 63. The omnidirectional flow of the fuel as it impinges on the baffle 68 aids in thoroughly mixing the primary inlet fuel with the recycle fuel gas, providing a uniform fuel flow to the fuel output chamber 69.

Figure 10:
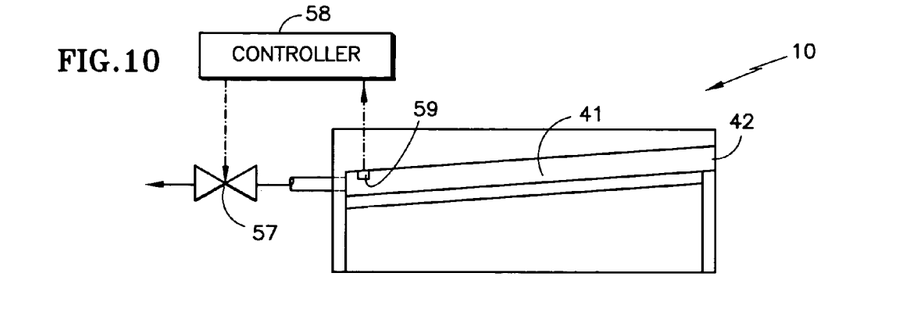
FIGS. 10-12 are top plan views of the inlet fuel distributors of FIGS. 2-4, with purge valves.

Referring to FIG. 10, the purge apparatus 57-59 may be utilized in the embodiment of FIG. 2 by providing the purge valve 57 and sensor 59 at the end of the fuel flow chamber 41 which is opposite to the fuel inlet 42.

Figure 11:
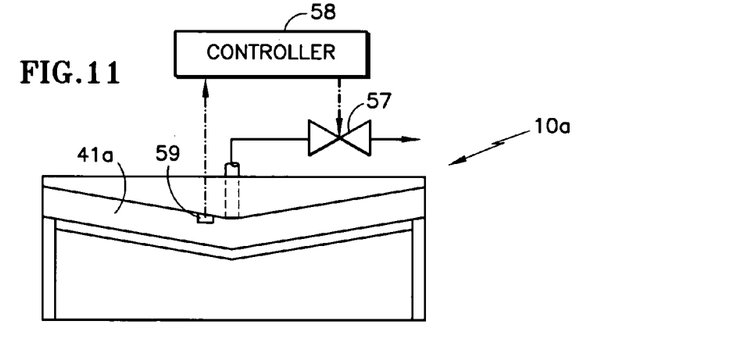

Similarly, in FIG. 11, the purge apparatus 57-59 may be utilized with the embodiment of FIG. 3 by providing the valve 57 and the hydrogen sensor 59 near the center of the fuel flow chamber 41a.

Figure 12:
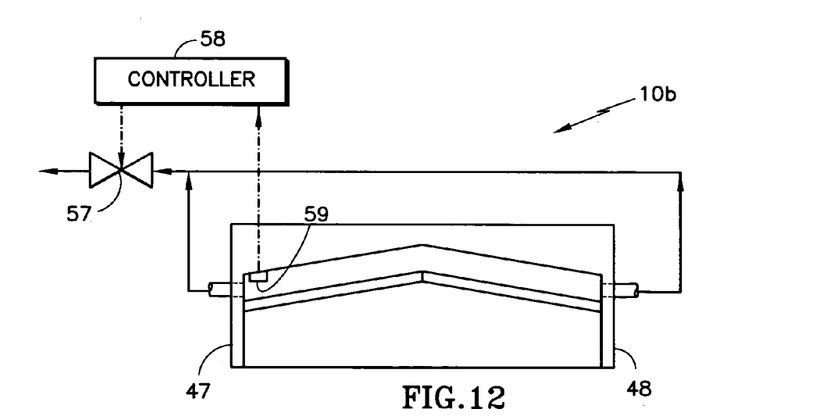

In FIG. 12, the purge apparatus may be connected to both ends 47, 48 of the embodiment of FIG. 4 with the hydrogen sensor 59 mounted near either end.

The aforementioned patent application is incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:

1. A fuel cell power plant (9), comprising:
   a plurality of fuel cells (13), each of said fuel cells having at least one fuel flow field (58), each fuel flow field having a fuel inlet and a fuel outlet;
   a fuel gas supply pipe (24, 83);
   a fuel gas inlet manifold (12, 53, 63) in fluid communication with all of said fuel flow field inlets;
   a fuel gas inlet chamber interconnected with said fuel supply pipe and including a permeable baffle (39, 54, 60) through which fuel from said chamber is flowed into said fuel gas inlet manifold;
   an exhaust valve (30, 57) in fluid communication with said fuel inlet chamber upstream from said fuel gas inlet manifold, said exhaust valve being located at a distance from the interconnection of said fuel gas inlet chamber with said fuel gas supply pipe;
   a controller (21, 79) configured to cause said valve to be open during startup of the flow of fuel from said fuel gas supply pipe into said fuel gas inlet chamber, whereby to purge gas that is within said fuel gas inlet chamber prior to the flow of fuel gas; and
   a fuel recycle system (22, 23, 77, 78) for providing recycle fuel from said fuel outlets into said fuel gas inlet manifold downstream of said permeable baffle.

2. A fuel cell power plant (9) according to claim 1 wherein:
   fuel is received in one end of said fuel gas inlet chamber, and said fuel gas inlet chamber is tapered, becoming smaller at greater distances from said one end.

3. A fuel cell power plant (9) comprising:
   a plurality of fuel cells (13), each of said fuel cells having at least one fuel flow field (58), each fuel flow field having a fuel inlet;
   a fuel gas supply pipe (24, 83);
   a fuel gas inlet manifold (12, 53, 63) in fluid communication with all of said fuel flow field inlets; and
   an inlet fuel gas distributor having a fuel inlet chamber (10, 53, 62) interconnected with said fuel supply pipe and including a permeable baffle (39, 54, 60) through which fuel from said chamber is flowed into said fuel inlet manifold;
   characterized in that:
   said fuel gas inlet manifold (53, 63) includes a surface (53, 18, 68) which is substantially normal to the flow of fuel through said permeable baffle, and fuel flowing through said permeable baffle impinges on said surface thereby changing the direction of flow of said fuel and causing said flow of fuel to become substantially uniform.

4. A fuel cell power plant according to claim 3 wherein:
   portions of said permeable baffle which are closer to said fuel supply pipe are farther away from said fuel inlet manifold than portions of said permeable baffle which are at a distance from said fuel supply pipe.

5. A fuel cell power plant according to claim 3 wherein said permeable baffle is made of porous material.

6. A fuel cell power plant according to claim 3 wherein said permeable baffle is a tube.

7. A fuel cell power plant according to claim 3 wherein said permeable baffle comprises screening.

8. A fuel cell power plant according to claim 3 wherein said permeable baffle comprises mesh.

9. A fuel cell power plant according to claim 3 wherein:
said permeable baffle comprises honeycomb.

10. A fuel cell power plant (9), comprising:
a plurality of fuel cells (13), each of said fuel cells having at least one fuel flow field (58), each fuel flow field having a fuel inlet and a fuel outlet;
a fuel gas supply pipe (24, 83);
a fuel gas inlet manifold (12, 53, 63) in fluid communication with all of said fuel flow field inlets;
a fuel gas inlet chamber (10, 53, 62) interconnected with said fuel gas supply pipe and including a permeable baffle (39, 54, 60) through which fuel from said chamber is flowed into said fuel gas inlet manifold; and
a fuel recycle system (22, 23, 77, 78) for providing recycle fuel from said fuel outlets into said fuel inlet manifold downstream of said permeable baffle.

* * * * *